Nov. 22, 1927.  
J. F. VAN PATTON  
1,650,403  
BELT SHIFTER AND SAFETY GUARD FOR CONE PULLEYS  
Filed Aug. 28, 1925   2 Sheets-Sheet 1
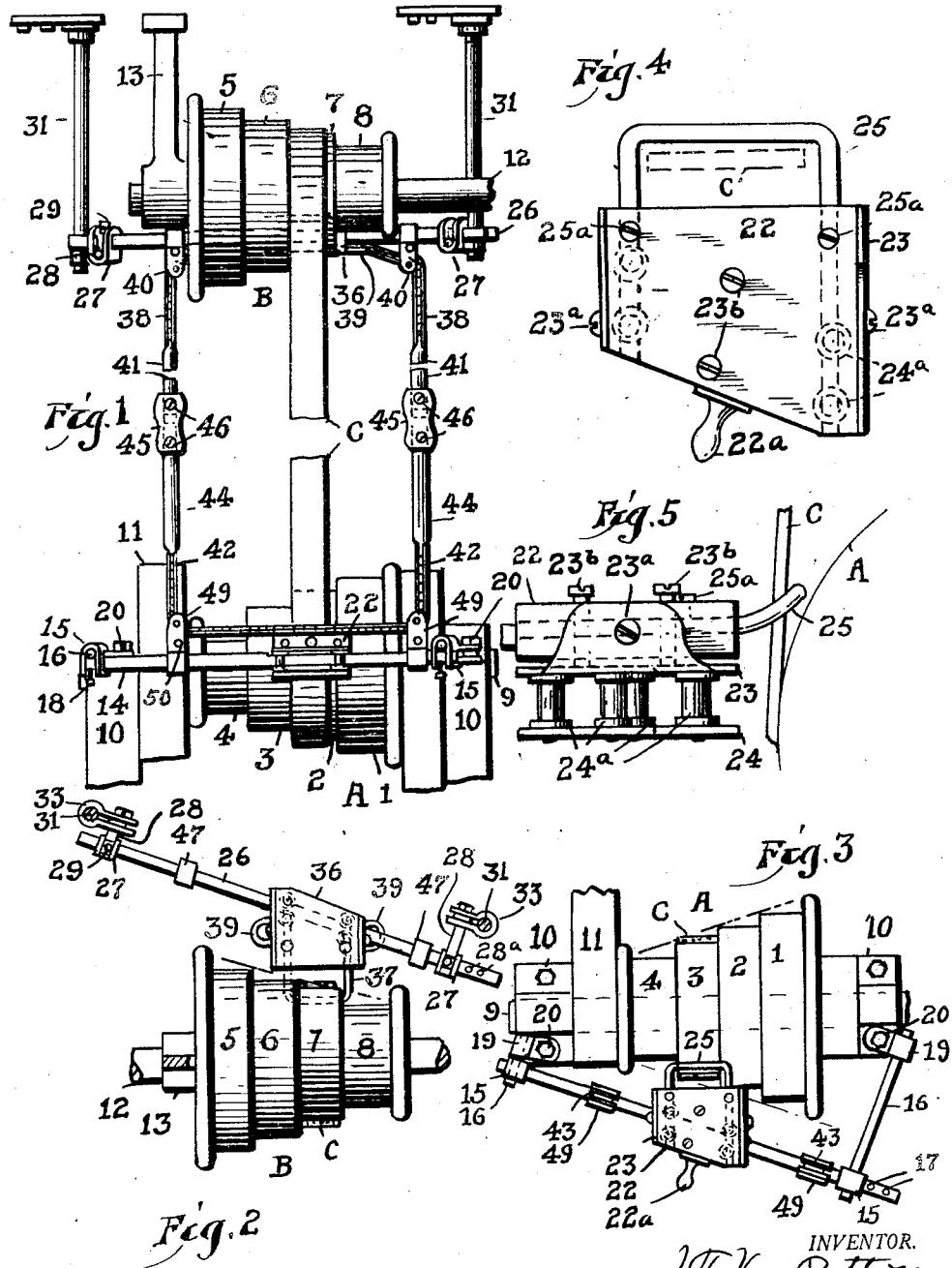

Nov. 22, 1927.  
J. F. VAN PATTON  
1,650,403  
BELT SHIFTER AND SAFETY GUARD FOR CONE PULLEYS  
Filed Aug. 28, 1925  2 Sheets-Sheet 2
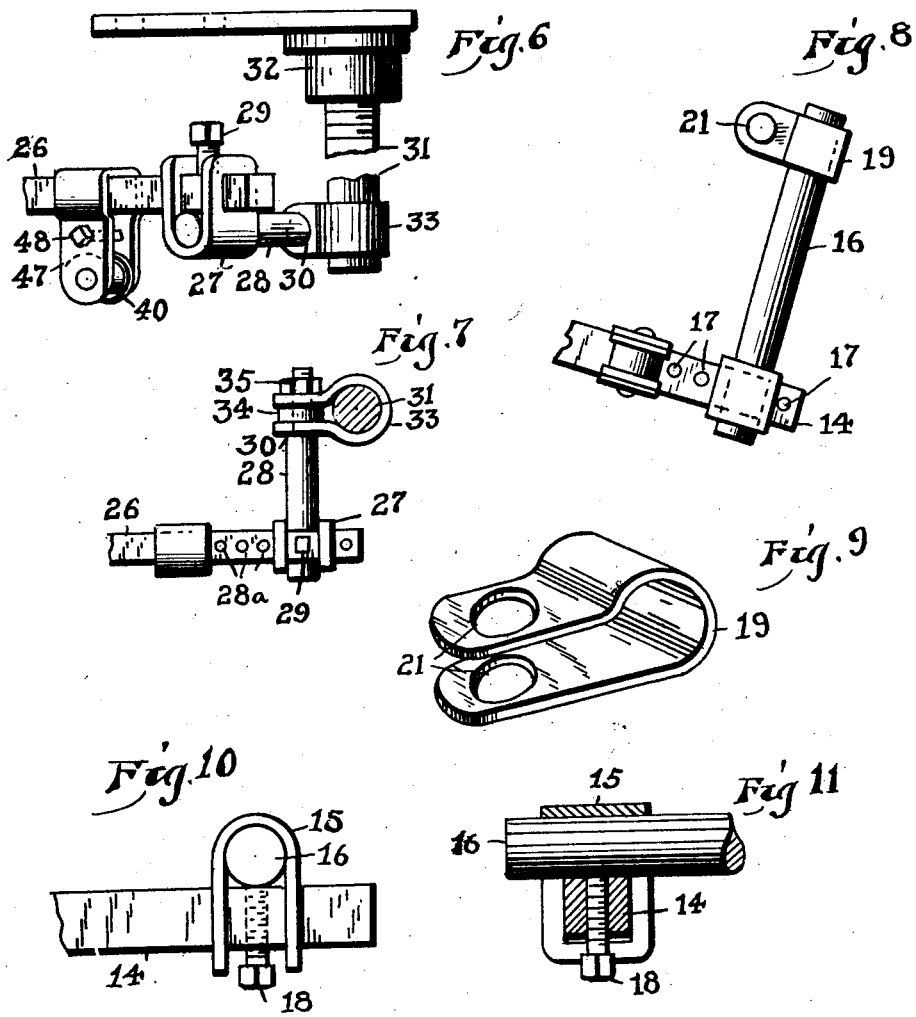
INVENTOR.  
J. F. Van Patton  
BY F. N. Barber  
ATTORNEY.

Patented Nov. 22, 1927.

1,650,403

UNITED STATES PATENT OFFICE.

JOHN F. VAN PATTON, OF MERCER, PENNSYLVANIA, ASSIGNOR TO REZNOR MANUFACTURING COMPANY, OF MERCER, PENNSYLVANIA, A CORPORATION OF PENNSYLVANIA.

BELT SHIFTER AND SAFETY GUARD FOR CONE PULLEYS.

Application filed August 28, 1925. Serial No. 52,992.

The main object of my present invention in to provide improved and more convenient means for shifting the belt connecting together two cones or the like.

Another object which I have in view is the combination with a belt-shifting device of safety-guard means for preventing the drawing of the workman's fingers or hand in the pinch between the cone and the belt.

In general my invention comprises a member slidably mounted in a plane angular to the axis of the cone and substantially parallel with a plane tangential to the open edges of the steps of the cone, and belt-engaging means carried by the said member so that the belt may be shifted from one step of the cone to another as said member is slid along its support in one direction or the other. The belt engaging means is located as close as possible to the pinch between the cone and the belt and thus forms a hand-guard to prevent injury to the workman. I provide each of the cones with similar shifting means so that a belt may be shifted on both cones in turn, the shift from greater to lesser diameter being made first.

In the accompanying drawings wherein I illustrate the best embodiment of the principles of my invention now known to me, Fig. 1 is a front elevation showing two opposed pulley-cones connected by a belt and with my invention applied thereto; Fig. 2 is a plan view of the upper cone and its belt shifting device; Fig. 3 is a similar view of the lower cone and its belt shifting device; Fig. 4 is an enlarged plan of the lower sliding member or block; Fig. 5 is a side elevation of Fig. 4 with a portion of the belt and the pulley A added; Fig. 6 is an enlarged detail in side elevation showing the method of supporting in place the bar upon which the upper shifter is slidably mounted; Fig. 7 is a plan view of the same, the depending stub shaft being shown in section; Fig. 8 is a broken plan view on enlarged scale of the bar upon which the lower shifter is slidably mounted on its support; Fig. 9 is a view in perspective of one of the clips employed for clamping the supports for the upper bar to the stub shafts; Fig. 10 is a detail in elevation showing the method of securing the ends of the lower bar, and Fig. 11 is a detail in section of the same taken at right angles to Fig. 10.

Referring to the drawings, A represents the lower cone, which is usually the driven cone, and which is provided in the usual manner with a plurality of steps, such as 1, 2, 3 and 4 of progressively diminishing diameters to provide for various speeds.

B represents the second or upper cone, usually the driving or power-cone, and which is provided with a like number of steps 5, 6, 7 and 8, of corresponding diameters but arranged in the reverse order.

The cone A is mounted on the shaft 9 journaled in bearings 10, the shaft being driven by the cone A. 11 indicates the safety-guard for the gears or other means for taking power from the shaft 9.

The cone B is mounted on the power shaft 12 journaled in bearings such as 13. As the upper shaft is usually the power-shaft the bearings 13 usually depend, as shown, from the ceiling or roof beams.

C represents the belt which operatively connects the two cones A and B.

14 is a bar preferably of square or at least non-circular cross section, and which is rigidly supported in front or on the pinch side of the cone A, being adjusted so that it is disposed in a vertical plane at an angle to the axis of the cone and substantially parallel with the plane, indicated by a dotted line in Fig. 3, which is tangential to the free edges of the steps of the cone.

Thus I have shown either end of the bar 14 extending through suitably shaped and alined holes in the two arms of the substantially U-shaped clips 15, the intermediate portion of the clip being clasped around a supporting rod 16. The bar 14 is tapped with a threaded hole 17 in which is screwed a set screw 18 whose inner end impinges on the rod 16. It is evident that when the screw is tightened the bar 14 is rigidly clamped to the rod 16. It is further evident that when the screw 18 is loosened the rod 16 may be adjusted in the clips. By providing one end of the bar 14 with a plurality of spaced apart threaded holes 17, the effective length of the bar 14 between the clips 15 may be adjusted.

Thus the bar 14 may be made in convenient lengths and its excess length cut off when the shifter is set up.

The inner ends of the rods 16 are clamped to fixed supports, shown in the drawings as the bearings of the cone A.

Thus I employ looped spring clamps 19 which encircle the rods 16 and have their ends clamped together and fixed in place by bolts 20 which are inserted down through alined holes 21 in the ends of the clamps and screwed into threaded holes in the bearings 10.

When the bolts 20 are loosened the rods 16 may be adjusted in the clamps and when said bolts are tightened the rods are rigidly clamped in place.

In the drawings I have shown the rod 16 superimposed on the bar 14, but it will be understood that the clips 15 may be inverted and the rod 16 placed below the bar 14, thus providing for lowering the bar 14 relative to the cone.

It is thus evident that the elevation of the bar 14, its nearness to the cone A and also its angularity both horizontally and vertically with respect to the axis of the cone may be nicely regulated as above provided.

22 is a block or carrier for supporting the loop 25 hereinafter described, and is indirectly mounted on the bar 14.

As a convenient method of mounting the block on the bar I may attach to either its lower or upper surface, dependent on whether the block is to be positioned above or below the bar, a roller cage or carriage comprised of the plates 23 and 24 between which are mounted the pairs of vertically disposed and grooved rollers 24ª which run on the bar, as shown in the drawings, the path of the bar being angularly disposed as shown. The cage may be attached to the block in any convenient manner. Thus I have shown the ends of the plate 23 bent at an angle to fit against the ends of the block and attached thereto, as by the screws 23ª.

A certain amount of clearance is provided between the face of a block 22 and the plate 23 so that the block may be tilted relative to the roller cage to provide for adjustment of the position of the block relative to the cone. Set screws 23ᵇ may be inserted through threaded holes in the block to impinge on the plate 23 on either side of the axis of the screws 23ª, thus providing means for fixing the block in its adjusted position relative to the roller cage.

Means, such as the handle 22ª is provided for moving the block along the bar.

In the drawings, the block 22 is shown above the bar, but it is evident that the roller cage may be above and the block beneath, thus permitting vertical adjustment of the block relative to the bar.

25 is the metal belt-loop, which is preferably formed by bending a bar of round metal to provide an intermediate cross-bar or portion and two parallel legs at right angles to the intermediate portion as shown. The two legs are inserted in holes extending through the block 22, set screws 25ª being provided to fix the loop relative to the block. It is evident that the loop may be adjusted relative to the block. When in position the legs extend on either side of the belt C and in close proximity to the edges of the same, while the intermediate portion of the loop is on the inner side of the belt and in close proximity thereto and parallel with the face of the belt. The legs are curved upwardly as shown in Fig. 5 so as to clear the cone and extend inwardly over the same so that the cross bar of the loop is in as close proximity as possible to the pinch between the belt and the cone.

Thus the cross-bar of the loop acts as a guard to prevent the fingers or hand of the workman being caught in the pinch or point of contact between the belt and the cone.

The space between the cross-bar of the belt-loop and the adjacent face of the block 22 is less than the width of the belt, and preferably less than one-half of said width, thus preventing the belt from twisting when being shifted.

It is evident when the block 22 is slid towards the left in Fig. 3, the belt will be shifted from the step 3 to the step 4 of the cone, and when the movement of the block is towards the right in Fig. 3 it will act to shift the belt from the step 3 to the step 2 of the cone.

The adjustment of the belt-loop relative to the block and the adjustment of the mounting of the block makes possible the nice adjustment of the belt-loop relative to the belt and to the cone, thus enabling the device to act efficiently in accomplishing the shift when the said is required, and also providing an effective safety-guard for the workman. The bar 14 also acts as a front guard for the protection of the workman.

Referring to the upper cone B, 26 is a bar similar to the bar 14 but positioned on the opposite side of the cone B from the position of the bar 26 relative to the cone A, the said bars being in each case located on the pinch side of the cone.

The ends of the bar 26 are inserted through the alined holes in the arms of the U-shaped clip 27 similar to the clip 15. 28 are supporting rods whose ends also extend through said clips. Set screws 29 are screwed through threaded holes in the bar 26 and impinge against the rods 28, thus clamping the bar and rod in rigid relationship. It is evident that the clips may be adjusted on the rods 28, and by a provision of a plurality of threaded holes 28ª at one end of the bar 26 the effective length of the bar 26 between the clips 27 may also be adjusted.

The other ends of the rods 28 are reduced, forming a shoulder 30, and their extremities are threaded. 31 are vertically disposed stub shafts which may be supported in any convenient manner. Thus I have shown their upper ends threaded and screwed into the socket-members 32 which may be attached to the ceiling or roof beams. 33 represents looped spring clamps similar to the clamps 19 which encircle the stub shafts 31 and through whose pierced ends the reduced portions of the rod 28 extend, a washer 34 with its opposite faces in angular relation to each other being mounted on the rods between the ends of the clamps. Nuts 35 are then screwed up on the ends of the rods, clamping the rods rigidly on the ends of the shafts. By first loosening the nuts the clamps may be adjusted vertically on the stub shafts, thereby adjusting the elevation of the bar 26.

It is evident that the elevation of the bar 26, its nearness to the cone B, and its angularity relative to the axis of the cone may be nicely adjusted.

The bar 26 is disposed in a vertical plane angular to the axis of the cone B and substantially parallel to a plane tangential to the free edges of the steps of said cone as indicated by the dotted line in Fig. 2.

36 is a block similar to the block 22 and in like manner slidably mounted on the bar 26. 37 is a belt-loop similar to the belt-loop 25 and extending around the belt in a manner similar thereto. The space between the block 36 and the cross-bar of the loop 37 is also preferably less than one-half of the width of the belt to prevent the belt twisting when being shifted. The belt-loop 37 is positioned as closely as possible to the pinch between the belt and the cone B to act as a safety-guard. The bar 26 also acts as a guard.

It is evident that if the block 36 be moved to the right in Fig. 2, the belt C will be shifted from the step 7 to the step 8, while a reverse movement of said block would act to shift the belt from the step 7 to the step 6.

Means convenient to the hand of the workman are provided for shifting the shifter of the upper cone.

Thus I have shown the chains 38 attached to the loops 39 on the opposite ends of the block 36 and led over the pulleys 40 mounted on the bar 26. The depending ends of the chains 38 are attached to short rods 41. 42 is a third chain running under the swiveled pulleys 43 mounted on the bar 14 and having its ends attached to short rods 44. The rods 41 and 44 are inserted into the opposed ends of the hand grasps 45 and held therein, as by set screws 46. Thus by grasping and pulling down on the right hand grasp 45 in Fig. 1, the upper shifter may be moved to shift the belt C from step 7 to step 8 of the cone B, while by pulling down on the left hand grasp the belt may be shifted from step 7 to step 6.

The pulleys 40 are mounted in brackets 47 which are slidably mounted on the bar 26 and fixed in position thereon, as by the clamping bolts 48. Thus the pulley brackets may be properly positioned on the bar 26 to act as stops to limit the path of movement of the block 36. Similarly the pulleys 43 are mounted in brackets 49 slidably mounted on the bar 14 and fixable thereon by the clamping bolts 50. Thus the brackets 49 may be properly positioned to act as stops to limit the movement of block 22.

In practice the workman first shifts the belt on one pulley-cone and then on the other, making the shift first on the cone whereon the belt is to be moved from larger to smaller diameter.

It is evident from the foregoing that the operation of the belt shifting is greatly expedited and made more convenient by the employment of my invention. There is no possibility of twisting the belt but the latter moves readily and evenly into its new position, thus avoiding excessive strain or deterioration. The location of the belt shifting device close to the cones renders the shifting of the belt easier than it is in the case of the shifting devices now in general use.

The belt-loops form effective finger and hand guards to prevent the workman becoming injured.

The novel U-shaped clip connection employed to attach the bars 14 and 26 to their supporting rods is useful for connecting any elements, such as rods or bars, in such a manner that their relative positions may be adjusted.

The structure of my device is simple and inexpensive and no parts are easily broken nor liable to undue wear. The device may be easily and quickly repaired on the job when repairs are required.

Although I have shown my invention applied to step cone pulleys, it is evident that it may be advantageously employed in connection with tapered cone pulleys and pulleys of other well known types.

What I desire to claim is—

1. In a belt shifting device for a belt on a pulley, the combination of a stationary guide, a carriage slidable longitudinally of said guide, a pair of parallel and spaced apart ears projecting from the carriage, a loop carrier mounted between said ears so as to be capable of pivotal movement for its adjustment relative to the carriage upon which it is mounted, means for fixing the carrier relative to the carriage in its adjusted position, and a belt embracing loop extending from the carrier.

2. In a belt shifting device for a belt on a pulley, the combination of a stationary guide, a carriage slidable longitudinally of said guide and prevented from other movement relative to the guide, a pair of parallel and spaced apart ears projecting from the carriage, a loop carrier mounted between said ears so as to be capable of pivotal movement for its adjustment relative to the carriage upon which it is mounted, means for fixing the carrier relative to the carriage in its adjusted position, and a belt embracing loop extending from the carrier and means for adjusting the extent of the loop relative to the carrier.

3. In a belt shifting device for a belt on a pulley, the combination of a stationary guide, a carriage slidable longitudinally of said guide, a pair of parallel and spaced apart ears projecting from the carriage, a loop carrier mounted between said ears so as to be capable of pivotal movement for its adjustment relative to the carriage upon which it is mounted, means for fixing the carrier relative to the carriage in its adjusted position, a belt embracing loop extending from the carrier, and means for adjusting the extent of the loop relative to the carrier.

4. In a belt shifting device for a belt on a pulley, the combination of a stationary guide, a carriage slidable longitudinally of the guide, a loop carrier pivotally mounted on the carriage to permit its adjustment relative to the carriage, means for fixing the carrier relative to the carriage, and a belt embracing loop extending from the carrier, said loop adjacent to the belt being curved out of the plane of the carrier to permit the approach of the carrier closely to the belt to act as a hand guard.

5. In a belt shifting device for a belt on a pulley, the combination of a stationary guide, a carriage slidable longitudinally of the guide, a loop carrier pivotally mounted on the carriage to permit its adjustment relative to the carriage, means for fixing the carrier relative to the carriage, a belt embracing loop extending from the carrier, said loop adjacent to the belt being curved out of the plane of the carrier to permit the approach of the carrier closely to the belt to act as a hand guard, and means for adjusting the extent of the loop relative to the carrier.

In testimony whereof, I hereunto affix my signature.

JOHN F. VAN PATTON.